United States Patent
Keegan

(10) Patent No.: US 9,138,831 B2
(45) Date of Patent: Sep. 22, 2015

(54) ADDITION OF RARE EARTH ELEMENTS TO IMPROVE THE PERFORMANCE OF SELF SHIELDED ELECTRODES

(75) Inventor: James M Keegan, Chardon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1461 days.

(21) Appl. No.: 12/147,607

(22) Filed: Jun. 27, 2008

(65) Prior Publication Data

US 2009/0321404 A1 Dec. 31, 2009

(51) Int. Cl.
*B23K 35/34* (2006.01)
*B23K 35/02* (2006.01)
*B23K 35/36* (2006.01)
*B23K 35/362* (2006.01)

(52) U.S. Cl.
CPC ......... *B23K 35/0261* (2013.01); *B23K 35/3601* (2013.01); *B23K 35/362* (2013.01)

(58) Field of Classification Search
CPC ............. B23K 35/3601; B23K 35/362; B23K 35/0261
USPC ................. 219/145.23, 145.22, 145.1, 146.1, 219/146.23, 146.22, 146.3, 146.24, 146.31; 148/23, 24, 26

See application file for complete search history.

(56) References Cited

U.S. PATENT DOCUMENTS

| | | | | |
|---|---|---|---|---|
| 1,977,278 A | * | 10/1934 | Judy | 428/560 |
| 2,473,601 A | * | 6/1949 | Lobosco | 219/74 |
| 2,694,764 A | * | 11/1954 | Muller | 219/74 |
| 2,909,648 A | * | 10/1959 | Landis et al. | 219/137 R |
| 2,909,778 A | * | 10/1959 | Landis et al. | 219/146.3 |
| 3,321,727 A | * | 5/1967 | Schrewelius | 338/330 |
| 3,447,912 A | * | 6/1969 | McCullough et al. | 428/553 |
| 3,458,685 A | * | 7/1969 | Kobayash et al. | 219/146.24 |
| 3,479,230 A | * | 11/1969 | Roberts | 75/254 |
| 3,522,021 A | * | 7/1970 | Cook et al. | 428/615 |
| 3,620,830 A | * | 11/1971 | Kramer | 219/145.23 |
| 3,767,891 A | * | 10/1973 | Haverstraw et al. | 219/146.3 |
| 3,778,588 A | * | 12/1973 | Bishel | 219/146.52 |
| 4,186,293 A | * | 1/1980 | Gonzalez et al. | 219/146.24 |
| 4,379,250 A | * | 4/1983 | Hosoki et al. | 313/336 |
| 4,689,092 A | * | 8/1987 | Suzuki et al. | 148/26 |
| 4,738,389 A | * | 4/1988 | Moshier et al. | 228/198 |
| 4,812,178 A | * | 3/1989 | Dubost | 148/695 |

(Continued)

FOREIGN PATENT DOCUMENTS

| CA | 2727751 | | 12/2010 |
|---|---|---|---|
| DE | 244930 A | * | 4/1987 |

(Continued)

OTHER PUBLICATIONS

Gschneidner and Calderwood:"Aluminium—Cerium" In: Thaddeus B. Massalski. "Binary Alloy Phase.."; Aug. 1987; American Society for Metals, OH, XP002543441; ISBN 087170262, vol. 1.

(Continued)

*Primary Examiner* — Tu Hoang
*Assistant Examiner* — Brett Spurlock
(74) *Attorney, Agent, or Firm* — Perkins Coie LLP

(57) ABSTRACT

A self-shielding welding electrode and a method of making the same are provided. The self-shielding welding electrode contains rare earth aluminide in either the flux or the electrode portion of the electrode. The self-shielding welding electrode contains at least about 0.5% by weight of the flux of rare earth aluminide.

26 Claims, 2 Drawing Sheets

(56) References Cited

U.S. PATENT DOCUMENTS

| | | | |
|---|---|---|---|
| 5,124,530 A * | 6/1992 | O'Donnell et al. | 219/146.23 |
| 5,211,910 A * | 5/1993 | Pickens et al. | 420/532 |
| 5,391,854 A * | 2/1995 | Namba et al. | 219/118 |
| 5,484,461 A * | 1/1996 | Rothman et al. | 29/623.5 |
| 5,512,241 A * | 4/1996 | Kramer et al. | 420/528 |
| 5,578,144 A * | 11/1996 | Satou et al. | 148/415 |
| 5,580,475 A * | 12/1996 | Sakai et al. | 219/145.22 |
| 5,779,842 A * | 7/1998 | Fawcett et al. | 156/250 |
| 6,149,737 A * | 11/2000 | Hattori et al. | 148/403 |
| 6,475,647 B1 * | 11/2002 | Mendez Acevedo et al. | 428/678 |
| 6,818,315 B2 * | 11/2004 | Lintunen et al. | 428/472.1 |
| 7,226,493 B2 * | 6/2007 | Grong et al. | 75/255 |
| 2004/0071586 A1 * | 4/2004 | Rioja et al. | 420/532 |
| 2005/0014652 A1 * | 1/2005 | Seleznev et al. | 505/100 |
| 2006/0096966 A1 * | 5/2006 | Munz et al. | 219/145.22 |

FOREIGN PATENT DOCUMENTS

| | | | |
|---|---|---|---|
| EP | 2307168 | | 12/2009 |
| GB | 1 057 188 | | 2/1967 |
| GB | 1057188 | * | 2/1967 |
| JP | 52031938 | * | 9/1975 |
| JP | 58 055196 | | 4/1983 |
| JP | 58 110192 | | 6/1983 |
| JP | 58110192 A | * | 6/1983 |
| JP | 01215495 A | * | 8/1989 |
| JP | 02084295 A | * | 3/1990 |
| SU | 721296 A | * | 3/1980 |
| SU | 912442 B | * | 3/1982 |
| SU | 935238 B | * | 6/1982 |
| WO | WO/2009/156807 | | 12/2009 |

OTHER PUBLICATIONS

Database WPI Week 197716, Thomas Scientific, London, GB; AN 1977-28187Y, XP002543198; JP 52 031938; Mar. 10, 1977; Kobe Steel Ltd., abstract.

Database WPI Week 195043 Thomas Scientific, London, GB, AN 1980-76596C; XP002543199; SU 721 296; Mar. 15, 1980; Podoiskit B A., abstract.

International Search Report (ISR) issued in counterpart application, International Application No. PCT/IB2009/005858 on Sep. 9, 2809, 6 pages.

International Preliminary Report on Patentability (IPRP) issued in counterpart application, International Application No. PCT/IB2009/005858 on Oct. 13, 2010, 9 pages.

Written Opinion of the International Searching Authority (WO) issued in counterpart application, International Application No. PCT/IB2009/0005858) on Sep. 9, 2009, 7 pages.

Gschneidner, Jr., K. A. et a., "Al—Ce (Aluminum—Cerium)," Binary Alloy Phase, American Society for Metals, 2 pages, Aug. 1987.

International Application No. PCT/IB2009/005858, International Preliminary Report on Patentability, 9 pages, Oct. 13, 2010.

International Application No. PCT/IB2009/005858, International Search Report & Written Opinion, 13 pages, Sep. 9, 2009.

* cited by examiner

ADDITION OF RARE EARTH ELEMENTS TO IMPROVE THE PERFORMANCE OF SELF SHIELDED ELECTRODES

BACKGROUND OF THE INVENTION

1. Field of the Invention

Devices, systems, and methods consistent with the invention relate to a method and apparatus of improving the weld performance of self-shielding electrodes.

2. Description of the Related Art

Since their introduction to welding, the use of self-shielding electrodes has grown rapidly. Self-shielding electrodes are used in many types of different welding operations, such as shielded metal arc welding ("SMAW") and flux-cored arc welding ("FCAW"). The many advantages of these welding methodologies are well known and will not be repeated herein. In each of these welding methodologies the electrode generates its own shielding gas, via the flux, to remove oxygen and nitrogen from the area of the molten weld pool and to "kill" the weld pool. The shielding gas is generated by compounds contained in the welding flux which decompose during welding. The released gas reduces the partial pressure of nitrogen and oxygen in the welding arc environment so that absorption of nitrogen and oxygen from the weld pool is reduced.

The need to remove oxygen and nitrogen from the molten weld pool and "kill" the weld pool, and the reasons therefore, are also well known.

To achieve the removal of oxygen and nitrogen from the weld metal, typical self-shielding electrodes contain a certain quantity of aluminum in either the flux or the metal electrode, or both. The presence of aluminum aids in blocking nitrogen and oxygen from the weld metal, as well as "killing" the weld pool. Specifically, the added aluminum helps to take nitrogen out of the weld pool by reacting with it to create aluminum nitride. Some of the aluminum nitride then floats out of the weld pool while some remains within the weld metal. However, the use of aluminum is not without its drawbacks.

Specifically, the presence of aluminum in the weld metal has the tendency to close the gamma loop on the iron-carbon phase diagram, see FIG. 1. Because of this, the presence of aluminum tends to restrict the phase transformation from the delta to the gamma to the alpha phases. A result of this restriction is the creation of large unrefined grains in the structure of the weld metal. The presence of large unrefined grain structure in the weld metal results in a weld which has poor ductility, i.e. the weld is brittle. In many applications, a brittle weld is undesirable.

Accordingly, an electrode composition is needed which blocks the entry of nitrogen and oxygen into the weld metal and does not close or significantly interfere with the phase transformations in the weld metal.

BRIEF SUMMARY OF THE INVENTION

A welding electrode, in accordance with an embodiment of the present invention, contains a metallic electrode portion and a flux portion which is adjacent to the metallic electrode portion. At least one of the metallic electrode portion and the flux portion contains a rare earth aluminide.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
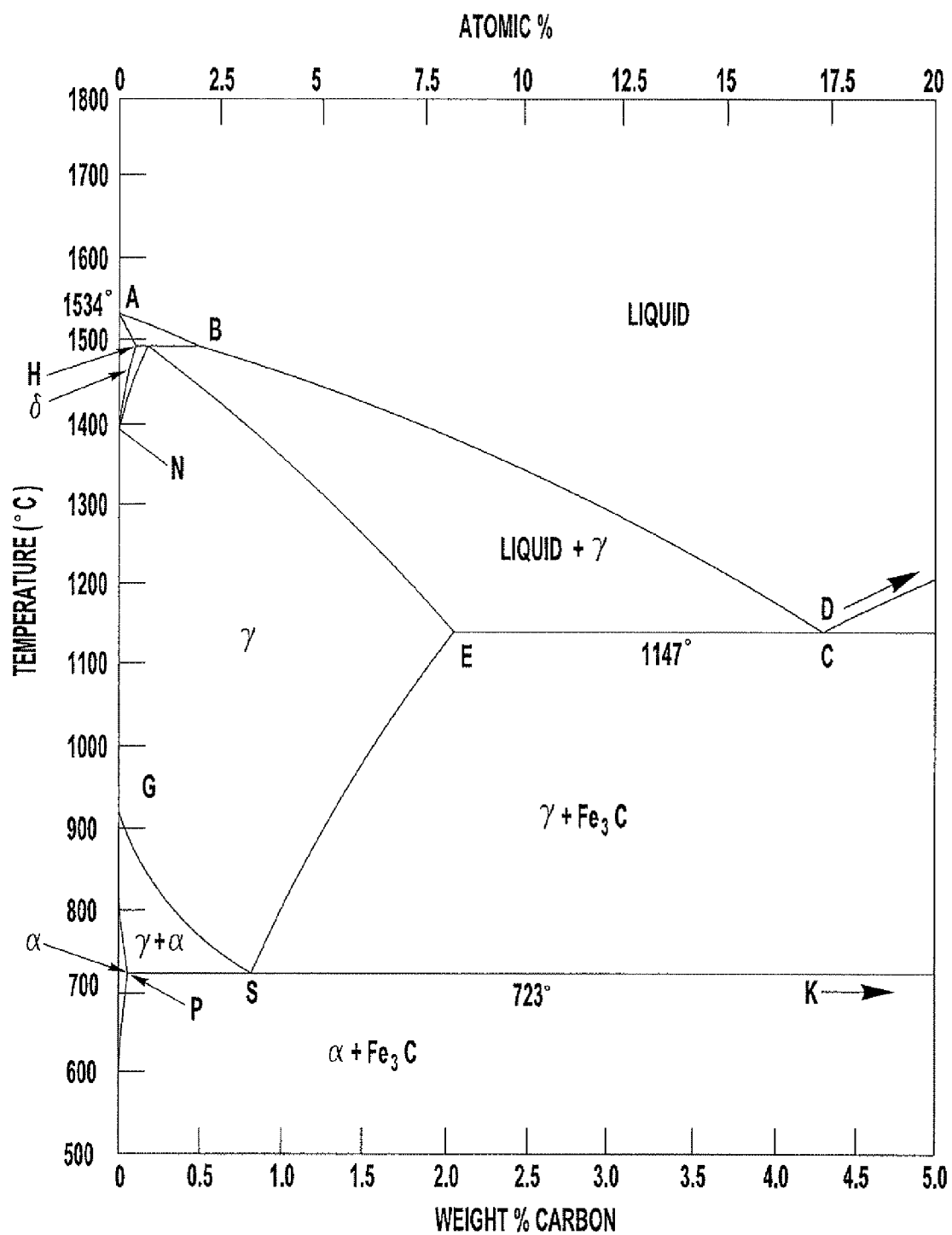
FIG. 1 illustrates a diagrammatical representation of an iron-carbon phase diagram.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts an iron-carbon phase diagram showing each of the equilibrium phases of the thermodynamically distinct gamma, delta and alpha phases of steel. Because those of ordinary skill in the art understand the information set forth in the iron-carbon diagram, a detailed discussion herein will be omitted. FIG. 1 is merely provided as a reference to aid in further understanding of the following discussion of the present invention.

Figure 2A:
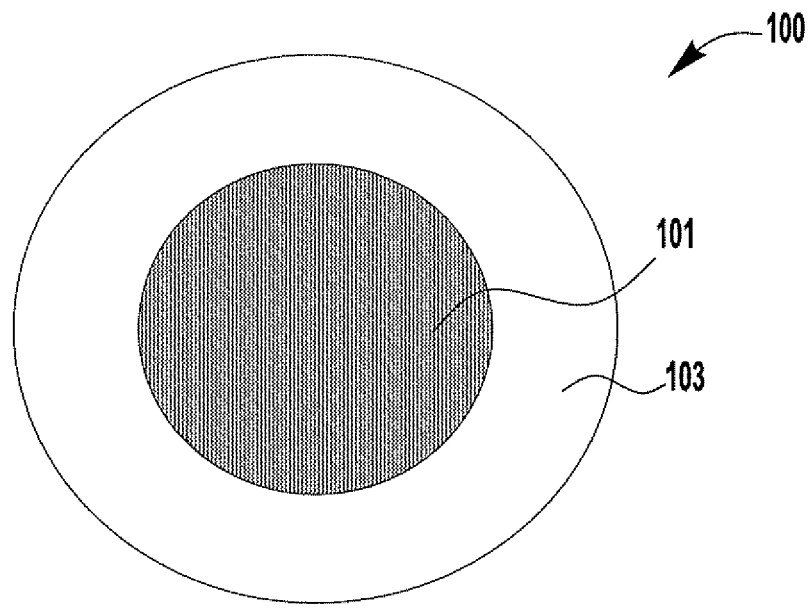
FIGS. 2A and 2B illustrate diagrammatical representations of cross-sections of electrodes in accordance with embodiments of the present invention.
Figure 2B:
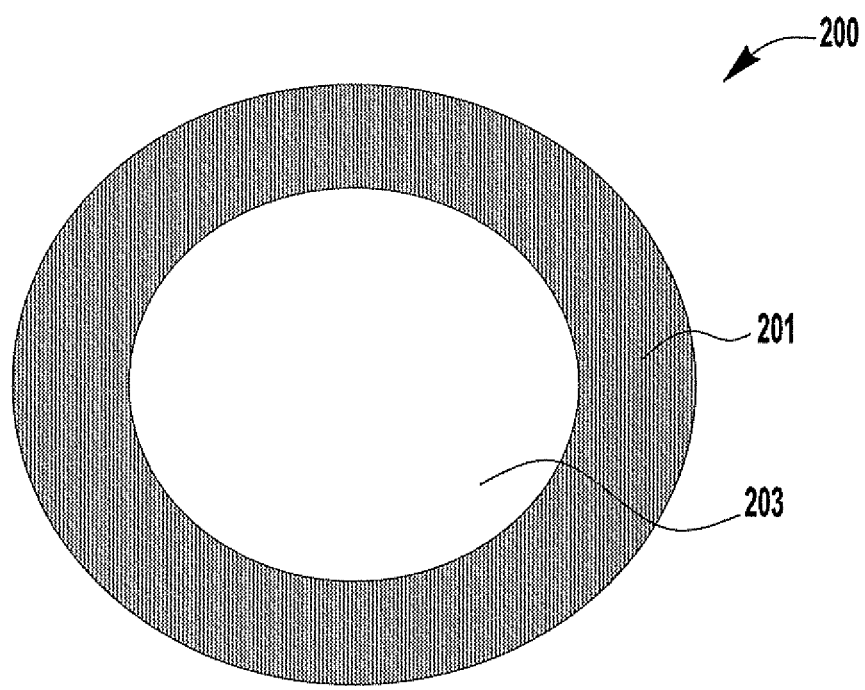

Turning now to FIGS. 2A and 2B, cross-sections of self-shielding welding electrodes 100/200 are depicted. In FIG. 2A the electrode 100 is a flux-cored electrode in which a flux core 101 is surrounded by a metal electrode portion 103. FIG. 2B depicts a self-shielding electrode 200 often referred to as a "stick electrode" in which a metal core electrode portion 203 is surrounded by a coating of flux 201. In each configuration, the flux 101/201 is employed to create a shielding gas during the welding operation to, inter alia, remove oxygen and nitrogen from the weld metal. This is accomplished by shielding air from the weld pool. It should be noted that the overall physical dimensions of the electrodes, such as diameter, etc., are similar to that of known electrodes, and the present invention is not limited in this regard.

In an embodiment of the present invention, at least one of the flux 101/201 and electrode portion 103/203 contain a rare earth aluminide. In the present invention, the presence of a rare earth aluminide in flux 101/201 and/or electrode portion 103/203 allows for the overall reduction of aluminum present in the electrode 100/200. It has been discovered that in applications, such as welding, rare earth aluminides act as denitriders and deoxidizers to eliminate nitrogen and oxygen from a weld pool (as does aluminum). However, it has also been discovered that rare earth aluminides act as denitriders and deoxidizers with minimal, or no, negative affects to the phase transformation of iron-carbon systems. Thus, in an embodiment of the present invention, at least some of the aluminum which would normally be present in an electrode is replaced with at least one rare earth aluminide.

In the present invention, the use of rare earth aluminides allows for the reduction of the amount of aluminum in the overall electrode 100/200, without a decrease in the shielding performance of the electrode and without any adverse metallurgical affects in the resulting weld. In fact, using electrodes in accordance with various embodiments of the present invention will result in improved metallurgical properties over prior art electrodes because the overall amount of aluminum remaining in the weld is reduced.

As discussed previously, the presence of aluminum in a weld pool can interfere with the phase transformation of steel from its delta to gamma to alpha phases. (See FIG. 1). In particular, the presence of aluminum tends to close the gamma loop on the iron-carbon phase diagram, FIG. 1. This results in the creation of a large unrefined grain structure in the weld, which leads to a weld lacking toughness and durability (i.e. the weld can be brittle). However, in prior electrodes a minimum amount of aluminum was needed to act as a denitrider and deoxidizer during the welding process.

By employing electrodes of the present invention, the above adverse metallurgical affects are avoided and/or eliminated, while maintaining the desired shielding capabilities of the electrode. Again, this is because it has been discovered that rare earth aluminides, in welding applications, act as denitriders and deoxidizers without tending to close the gamma loop of the weld metal. Thus, the present invention allows for the amount of aluminum to be used in an electrode to be reduced or eliminated, with little or no compromise in the shielding performance of the electrode and no adverse metallurgical affects. In fact, electrodes in accordance with embodiments of the present invention can result in superior metallurgical properties, such as weld toughness, over prior art electrodes.

In an embodiment of the present invention, the rare earth aluminide can be selected from any one of, but is not limited to, cerium aluminide (Ce Al), lanthanum aluminide (La Al), neodymium aluminide (Nd Al), lithium aluminide (Li Al), iron cerium aluminide (Fe Ce Al), Iron Cerium (Fe Ce), or any other rare earth aluminide or other rare earth alloy. The present invention also contemplates employing combinations of the above referenced rare earth aluminides, other rare earth aluminides and rare earth alloys.

In a further embodiment of the present invention, the electrode 100/200 contains a combination of a plurality of rare earth aluminides and/or rare earth silicides, including but not limited to those identified above. The combination of rare earth aluminides employed and the ratios of each rare earth aluminide used is a function of performance and design standards, and is within the level and knowledge of those skilled in the art. Additionally, in another embodiment of the invention a rare earth aluminide can be combined with a rare earth silicide. For example, in an embodiment of the present invention, a cerium aluminide is combined with a rare earth silicide and added to the flux material/electrode. Because of the presence of silicon the use of rare earth silicides should be limited. However, in a non-limiting exemplary embodiment up to about 1% by weight of the flux of a rare earth silicide and up to about 6% by weight of the flux of a rare earth aluminide is employed. Of course, the present invention is not limited to these identified percentages as they are intended to be exemplary in nature. The combinations and/or percentages employed are a function of performance and design paramaters.

In an embodiment of the invention, the rare earth aluminide, or combinations thereof, is present only in the flux 101/201 of the electrode 100/200. In another embodiment of the present invention, at least a portion the rare earth aluminide is present in the electrode portion 103/203 of the electrode 100/200. Because rare earth aluminides are often available in powder and/or granular form, placement of the rare earth aluminide in the flux 101/201 of an electrode 100/200 is the most convenient from a manufacturability view. In such an embodiment the rare earth aluminide powder can be added to the flux during the flux mixing process and then added to the electrode 100/200 during the manufacturing process. However, the present invention is not limited on this regard, and the rare earth aluminide can be added to only the electrode portion 103/203 during the manufacture of the electrode portion 103/203. Further, as indicated above, the rare earth aluminide, or combinations of rare earth aluminides, can be added to both the flux 101/201 and electrode portion 103/203 during their respective manufacturing steps.

Prior welding electrodes can have up to about 12% aluminum by weight of the flux. Other electrodes can have an amount of aluminum in the range of 8 to 15% by weight, depending on the electrode application and type. The use of these prior electrodes can result in weld deposits having about 1.12% by weight of aluminum, and the use of some electrodes result in weld deposits having as high as about 1.5% by weight of aluminum. However, it is known that as the amount of aluminum in weld deposits approaches about 1.5%, or more, by weight of the weld deposit, the weld tends to become brittle and lack the needed toughness.

By employing electrodes 100/200 of the present invention the resulting amount of aluminum in a weld deposit can be reduced, thus providing a weld with improved metallurgical characteristics such as toughness.

In an embodiment of the present invention, the rare earth aluminide completely replaces aluminum in the overall electrode. Thus, if a prior electrode contained about 10% aluminum by weight of the flux, an electrode in accordance with the present invention will contain about 10% by weight of rare earth aluminide, and no added aluminum. In a further embodiment of the present invention, the electrode contains a combination of rare earth aluminide with another rare earth alloy. For example, in a non-limiting embodiment of the present invention, the electrode contains about 9% of rare earth aluminide by weight of the flux and about 1% of rare earth silicide by weight of the flux.

Of course it is understood to those of ordinary skill in the art that due to various manufacturing techniques, trace amounts of aluminum may exist in an electrode as a function of manufacturing processes and the materials used. For purposes of the above embodiment, the present invention contemplates replacing the amount of intentionally added aluminum with rare earth aluminide.

In a further embodiment of the present invention, it is not necessary to replace the entire amount of added aluminum with a rare earth aluminide(s), as the benefits of the present invention can be achieved by using a combination of aluminum and rare earth aluminide in the overall electrode. For example, if a prior art electrode contained about 10% by weight of the flux of aluminum, an embodiment of the present invention can contain about 5% by weight of aluminum and about 5% by weight of rare earth aluminide.

It is noted that depending on the reactivity of the rare earth aluminide and its components, such as the Cerium, the percentages of rare earth aluminide may need to be adjusted to achieve the desired performance. This is within the level of those skilled in the art. For example, depending on the reactivity of the rare earth aluminide (namely the Cerium), to achieve similar performance of an electrode having about 10% by weight of aluminum it may be needed to employ a flux having about 5% by weight of aluminum and about 6% by weight of rare earth aluminide. Stated differently, depending on the reactivity of the rare earth aluminide there is not necessarily a "one-to-one" ratio between the amount of aluminum used in a prior electrode and the rare earth aluminide/alloy used in accordance with the present invention. It is within the knowledge and level of those skilled in the art to determine the appropriate amount of rare earth aluminide employed, whether the rare earth aluminide is combined with aluminum, other rare earth alloys or is used by itself.

The overall amount of rare earth aluminide used may be a function of the desired performance of the electrode 100/200 with regard to its ability to provide the needed deoxidization and denitridation and produce a weld having desirable metallurgical properties, such as toughness. Because rare earth aluminides are typically more expensive than aluminum it is contemplated that embodiments of the present invention will have an aluminum-to-rare earth aluminide ratio of greater than 1. That is the weight % of aluminum used is greater than the weight % of rare earth aluminide used.

By employing various embodiments of the present invention, the amount of aluminum in weld metal can be appreciably reduced, without a decrease in shielding performance. For example, an electrode having an aluminum-to-rare earth aluminide ratio of about 1 can result in a weld having about a 50% reduction of aluminum in the weld. That is, if the use of a prior electrode resulted in a weld having about 1.12% by weight of aluminum, an embodiment of the present invention can yield a weld having about 0.56% by weight of aluminum. This improves some of the metallurgical properties of the weld, without sacrificing shielding performance of the electrode.

Thus, in an embodiment of the present invention the electrode 100/200 can have up to about 15% by weight of the flux of rare earth aluminide. In a further embodiment, the electrode 100/200 contains up to about 10% by weight of the flux of rare earth aluminide. In yet another embodiment, the electrode 100/200 contains about 1% to about 5% by weight of the flux of rare earth aluminide. An additional embodiment of the present invention contains at least about 0.5% by weight of the flux of rare earth aluminide. Further embodiments contain between about 0.5% to about 15% of rare earth aluminide, about 0.5% to about 10% of rare earth aluminide and about 0.5% to about 5% of rare earth aluminide by weight of the flux. Of course, the overall percentages present in the electrode are a function of the electrode type, desired performance and construction and is determinable by those who are skilled in the art. For example, it is understood that the amount of rare earth aluminide employed in a FCAW may be different than the amount employed in a SMAW to achieve the same or similar weld quality and performance.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding electrode, comprising:
   a metallic electrode portion, and
   a flux portion adjacent to the metallic electrode portion,
      wherein at least one of said metallic electrode portion and flux portion contains a rare earth aluminide and aluminum,
   wherein said electrode comprises at least about 0.5% by weight of the flux portion of said rare earth aluminide,
   wherein a ratio of a weight % of said aluminum to a weight % of said rare earth aluminide is greater than one, and
   wherein said rare earth aluminide is selected from the group comprising cerium aluminide, lanthanum aluminide, neodymium aluminide, and iron cerium aluminide, including combinations thereof.

2. The welding electrode of claim 1, wherein at least one of said metallic electrode portion and flux portion further comprises a rare earth alloy in addition to said rare earth aluminide.

3. The welding electrode of claim 1, wherein at least one of said metallic electrode portion and flux portion further comprises a rare earth silicide.

4. The welding electrode of claim 1, wherein said rare earth aluminide is contained in said flux portion.

5. The welding electrode of claim 1, wherein said electrode comprises between about 1% and about 5% by weight of the flux portion of said rare earth aluminide.

6. The welding electrode of claim 1, wherein said electrode comprises between about 0.5% and about 15% by weight of the flux portion of said rare earth aluminide.

7. The welding electrode of claim 1, wherein said electrode comprises between about 0.5% and about 10% by weight of the flux portion of said rare earth aluminide.

8. The welding electrode of claim 1, wherein said electrode comprises between about 0.5% and about 5% by weight of the flux portion of said rare earth aluminide.

9. A welding electrode, comprising:
   a metallic electrode portion, and
   a flux portion adjacent to the metallic electrode portion,
      wherein at least one of said metallic electrode portion and flux portion contains aluminum and between about 0.5% to about 15% by weight of said flux portion of a rare earth aluminide,
   wherein a ratio of a weight % of said aluminum to a weight % of said rare earth aluminide is greater than one,
   wherein said rare earth aluminide is selected from the group comprising cerium aluminide, lanthanum aluminide, neodymium aluminide, and iron cerium aluminide, including combinations thereof, and
   wherein said rare earth aluminide is in at least one of a powder and a granular form.

10. The welding electrode of claim 9, wherein at least one of said metallic electrode portion and flux portion further comprises a rare earth alloy in addition to said rare earth aluminide.

11. The welding electrode of claim 9, wherein at least one of said metallic electrode portion and flux portion further comprises a rare earth silicide.

12. The welding electrode of claim 9, wherein said rare earth aluminide is contained in said flux portion.

13. The welding electrode of claim 9, wherein said electrode comprises between about 0.5% and about 10% by weight of the flux portion of said rare earth aluminide.

14. The welding electrode of claim 9, wherein said electrode comprises between about 0.5% and about 5% by weight of the flux portion of said rare earth aluminide.

15. A welding electrode, comprising:
   a metallic electrode portion, and
   a flux portion adjacent to the metallic electrode portion,
      wherein said flux portion contains aluminum and between about 0.5% to about 15% by weight of said flux portion of a rare earth aluminide,
   wherein a ratio of a weight % of said aluminum to a weight % of said rare earth aluminide is greater than one, and
   wherein said rare earth aluminide is selected from the group comprising cerium aluminide, lanthanum aluminide, neodymium aluminide, and iron cerium aluminide, and combinations thereof.

16. The welding electrode of claim 15, wherein at least one of said metallic electrode portion and flux portion further comprises a rare earth alloy in addition to said rare earth aluminide.

17. The welding electrode of claim 15, wherein at least one of said metallic electrode portion and flux portion further comprises a rare earth silicide.

18. The welding electrode of claim 15, wherein said flux portion comprises between about 0.5% and about 10% by weight of the flux portion of said rare earth aluminide.

19. The welding electrode of claim 15, wherein said flux portion comprises between about 0.5% and about 5% by weight of the flux portion of said rare earth aluminide.

20. A welding electrode, comprising:
a metallic electrode portion, and
a flux portion adjacent to the metallic electrode portion,
wherein at least one of said metallic electrode portion and flux portion contains a rare earth aluminide and aluminum,
wherein a ratio of a weight % of said aluminum to a weight % of said rare earth aluminide is greater than one,
wherein said electrode comprises between 0.5% and 15% by weight of the flux portion of said rare earth aluminide,
wherein said rare earth aluminide is selected from the group comprising cerium aluminide, lanthanum aluminide, neodymium aluminide, and iron cerium aluminide, including combinations thereof, and
wherein the welding electrode is a self-shielding electrode.

21. The welding electrode of claim 20, wherein at least one of said metallic electrode portion and flux portion further comprises a rare earth alloy in addition to said rare earth aluminide.

22. The welding electrode of claim 20, wherein at least one of said metallic electrode portion and flux portion further comprises a rare earth silicide.

23. The welding electrode of claim 20, wherein said rare earth aluminide is contained in said flux portion.

24. The welding electrode of claim 20, wherein said electrode comprises between 1% and 5% by weight of the flux portion of said rare earth aluminide.

25. The welding electrode of claim 20, wherein said electrode comprises between 0.5% and 10% by weight of the flux portion of said rare earth aluminide.

26. The welding electrode of claim 20, wherein said electrode comprises between 0.5% and 5% by weight of the flux portion of said rare earth aluminide.

* * * * *